United States Patent [19]

Yoshino

[11] Patent Number: 4,507,936

[45] Date of Patent: Apr. 2, 1985

[54] INTEGRAL SOLAR AND HEAT PUMP WATER HEATING SYSTEM

[75] Inventor: Hozo Yoshino, Tokyo, Japan

[73] Assignees: System Homes Company Ltd.; Mitsubishi Denki Kabushiki Kaisha, both of Tokyo, Japan

[21] Appl. No.: 524,669

[22] Filed: Aug. 19, 1983

[51] Int. Cl.³ .................................................. F25B 27/00
[52] U.S. Cl. ................................. 62/235.1; 62/183; 62/238.6; 237/2 B; 126/424
[58] Field of Search ................ 62/235.1, 238.6, 183; 237/2 B; 126/424

[56] References Cited

U.S. PATENT DOCUMENTS

| | | | |
|---|---|---|---|
| 4,220,138 | 9/1980 | Bottum | 62/235.1 X |
| 4,226,604 | 10/1980 | Weis | 62/235.1 X |
| 4,256,475 | 3/1981 | Schafer | 62/235.1 |
| 4,308,723 | 1/1982 | Ecker | 62/238.6 X |
| 4,336,692 | 6/1982 | Ecker et al. | 62/235.1 X |
| 4,339,930 | 7/1982 | Kirts | 62/238.6 X |
| 4,363,218 | 12/1982 | Nussbaum | 62/238.6 X |
| 4,364,239 | 12/1982 | Chapelle et al. | 62/238.6 X |
| 4,378,908 | 4/1983 | Wood | 62/238.6 X |
| 4,438,881 | 3/1984 | Pendergrass | 62/235.1 X |

Primary Examiner—Lloyd L. King
Attorney, Agent, or Firm—Oblon, Fisher, Spivak, McClelland & Maier

[57] ABSTRACT

A multi-mode water heating system wherein a capacity control mechanism is provide so that no additional heat source is required and via use of capacity control, either solar radiation energy or ambient air energy is selectively utilized dependent on the availability of sunshine. A system configuration is so arranged as to maximize the system seasonal coefficient of performance by a refrigeration cycle optimization which adjusts both a pump/compressor speed and pressure regulating valve opening.

28 Claims, 13 Drawing Figures

FIG. 3

| Operating Mode | Heat Source | | $T_{cond} - T_{evap}$ | | Solar Tracking | | Solar Evaporator Air Damper | | Pressure Regulating Valve | | Pump/Compressor Speed | | | Air Circulating Fan | |
|---|---|---|---|---|---|---|---|---|---|---|---|---|---|---|---|
| | Solar | Air | Equal | Pos | Yes | No | Closed | Open | Full Open | Part'l Open | Low | Med | High | On | Off |
| Solar Heat Pipe | O | | O | | O | | O | | O | | O | | | | △ |
| Solar Heat Pump | O | | | O | O | | O | | | O | O | O | | O | |
| Solar Ass'd Heat Pump | △ | O | | O | △ | | | O | | O | | O | | O | |
| Heat Pump | | O | | O | | O | | O | | O | | O | O | O | |

O : Primary    △ : Secondary

INTEGRAL SOLAR AND HEAT PUMP WATER HEATING SYSTEM

BACKGROUND OF THE INVENTION

1. Field of the Invention

The present invention relates to a water heating system, and more particularly, to an integral solar and heat pump water heating system wherein the coefficient of performance of the system is greatly improved by an active refrigeration cycle control using digital computer means.

2. Description of the Prior Art

Solar hot water systems have been gaining popularity in recent years because they utilize free solar energy. Refrigerant charged solar systems are of particular interest for their desirable efficiencies insofar as they employ latent heat transfer rather than sensible heat transfer. However, as evidenced in the U.S. Pat. Nos. 4,220,138 to Bottum, they require a backup heat source because they cannot attain usable water temperatures during winter seasons and because solar radiation is either unavailable or insufficient on rainy or cloudy days. Moreover, the heat transfer characteristic of the same is not optimized because of an inherent on-off control method for the refrigerant circulating pump means. Heat pump water heating systems are also enjoying a surge in popularity because of their compactness and efficiency. Solar assisted heat pump systems merit particular attention for their potential higher efficiencies. However, as disclosed in U.S. Pat. Nos. 4,226,604 to Weis and 4,302,942 to Charters et al, they also require a backup heat source because their capacity decreases at low ambient temperatures when the sun is not shining. The cost of installation is considerably higher than conventional heat pumps due to the expensive nature of solar collectors while the annual coefficients of performance are not significantly better as compared with the latter in that they operate at subambient temperature. The solar collectors are unglazed and are designed to derive heat energy from the surrounding air as well as from the sun's radiation.

SUMMARY OF THE INVENTION

An object of this invention is to demonstrate that an active refrigeration cycle control can reduce the drawbacks of the prior art and combine the advantages of the solar systems and the heat pump systems into one hardware system.

With the above in mind, it is a primary object of the present invention to provide a multi-mode water heating system wherein capacity control means are provided so that no additional heat source is required and by using said capacity control means, either the solar radiation energy or ambient air energy is selectively utilized dependent on the availability of the sunshine.

It is another object of the present invention to provide a highly efficient water heating system wherein the system configuration is so arranged as to maximize the system's seasonal coefficient of performance by refrigeration cycle optimization which adjusts both the pump/compressor speed and the pressure regulating valve opening.

An integral solar and heat pump water heating system is provided in accordance with this invention and the system consists of a solar evaporator, an accumulator, a compressor inlet heat exchanger, a variable speed pump/compressor, an electronically metered pressure regulating valve, a water storage tank, an in-tank condenser and a control unit. The solar evaporator includes an evaporator housing, a glazing panel, a plurality of integral plate-fin-tube collectors, a fan and dampers. The control unit includes temperature sensors, pressure transducers, a microcomputer, a pressure regulating valve drive, an inverter, buffer amplifiers and solid state relays, and limit switches. Whenever the solar radiation is available, the solar evaporator tracks the sun and the air dampers are closed to permit the trapped air in an evaporator chamber to be recycled by the fan within the solar evaporator housing. The pump/compressor speed is maintained at low to medium ranges. When solar energy is unavailable, the solar evaporator is kept at its neutral position and the air dampers are opened to permit fresh outdoor air to be drawn into the housing by the fan, the ambient heat energy of which is transferred to the refrigerant and the air is then released to the outdoor environment again. The pump/compressor speed is maintained at medium to high ranges.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 3 is a table showing the relation between four operating modes and the system function of the present invention;

DETAILED DESCRIPTION OF THE PREFERRED EMBODIMENT

Figure 1:
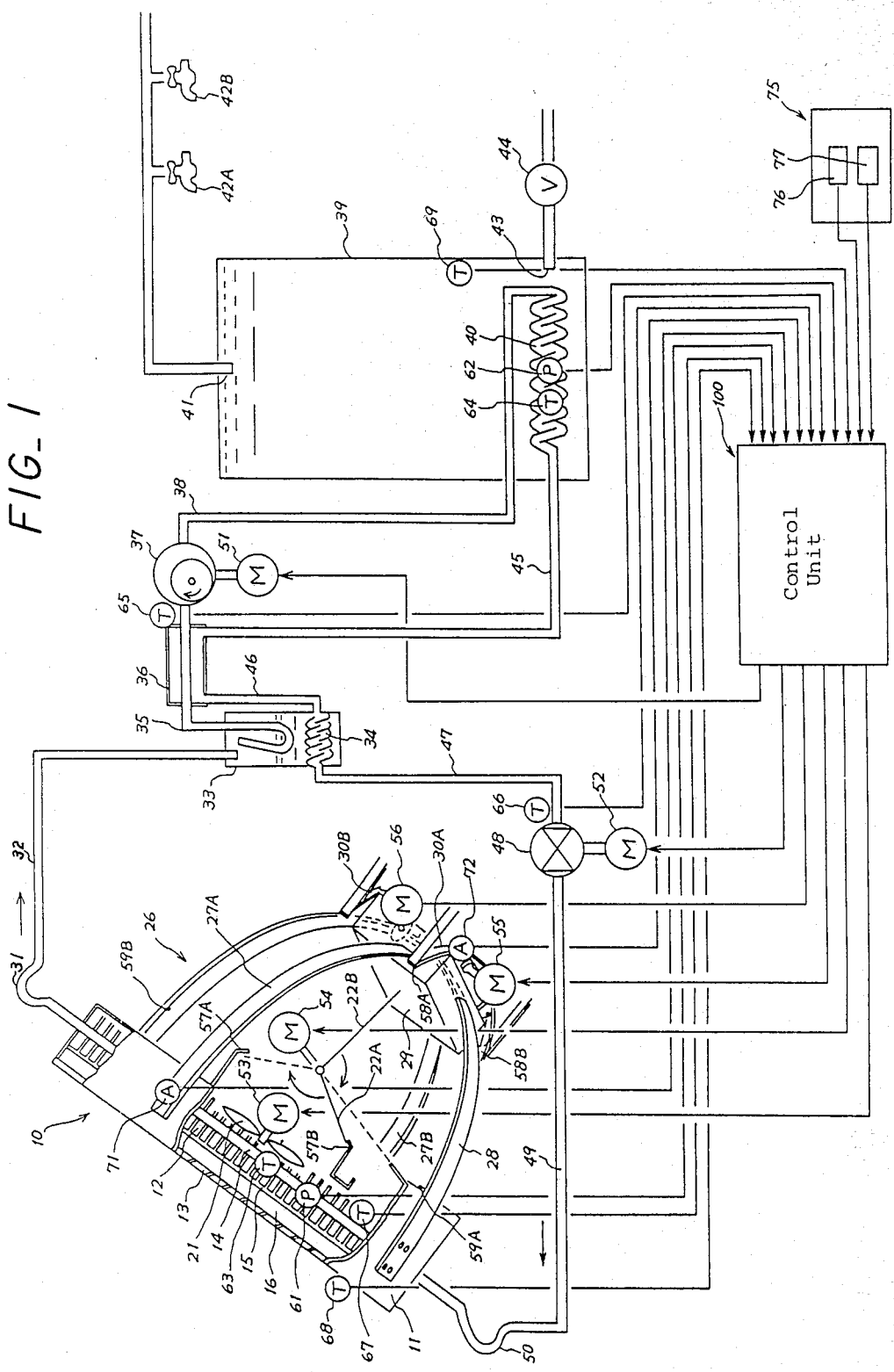
FIG. 1 is a system diagram of the present invention.

FIG. 1 is a system diagram showing a preferred embodiment of a water heating system according to the invention. R-22 is used as the refrigerant for this system. A solar evaporator 10 consists of a housing 11 which encloses a heat collection chamber 12, and a glass plate 13 which seals the front side of the housing 11. An evaporator coil 14 is disposed in the heat collection chamber 12 and is fitted as a unit with plate fins 15 each of which have an L-shaped cross section as shown in FIG. 1, the horizontal part of which forms a solar collector receiving the solar radiation heat through the glass plate 13 and transferring it to the evaporator coil 14, and the vertical part of which is used primarily for collecting heat from the ambient air and transferring it to the evaporator coil 14. Further, it is preferable to form an air insulation between the glass plate 13 and the plate fins 15 to improve the heat insulation characteristics.

Air is blown into the heat collection chamber 12 by means of a fan 21. The heat collection chamber 12 has a closed structure inside the solar evaporator housing 11 and when air dampers 22A and 22B are held open, as shown by the solid lines in FIG. 1, fresh outdoor air is blown into the chamber 12 by the fan 21 to transfer heat thereof to the plate fins and evaporator coil 14 and then discharged from the housing 11 to the surroundings. When the air dampers 22A and 22B are held closed, as shown by the dotted lines in FIG. 1, the air contained in the heat collection chamber 12 is recirculated inside the housing 11 by means of the fan 21.

The solar evaporator 10 preferably has solar tracking mechanisms 26. The tracking mechanisms 26 further comprise supports 27A and 27B, a rail 28, a motor box 29 and curved rails 30A and 30B. The rails 30A and 30B are firmly attached, for example, to the roof. The motor box 29 can move along the rails 30A and 30B to change the pitch angle of the solar evaporator 10. The rail 28 is firmly fastened to the solar evaporator housing 11 and can move relative to the motor box 29, while the supports 27A and 27B are fastened to the motor box 29 and can rotate about an axle protruded from the housing 11 to change the roll angle of the solar evaporator 10.

Heated refrigerant from the solar evaporator 10 is fed through a flexible piping 31 and a refrigerant passage 34 to an accumulator 33, wherein the liquid refrigerant is heat transferred from the condensing refrigerant in an accumulator coil 34 and the vapor refrigerant is separated. The separated vapor refrigerant is then fed through a passage 35 and a heat exchanger 36 where it is further superheated. It then enters a pump/compressor 37 by which the refrigerant is either simply circulated without compression or a high-pressure vapor.

The refrigerant vapor from the pump/compressor 37 is fed through a refrigerant passage 38 to an in-tank condenser 40 which is mounted on the bottom of a water storage tank 39. This tank 39 is insulated to store the hot water at a predetermined temperature. The in-tank condenser 40 transfers heat from the vapor refrigerant to the hot water contained in the tank 39. The hot water in the tank 39 is fed through an outlet 41 to water faucets 42A and 42B, etc., to supply hot water for various domestic uses. Cold water is added from a water inlet 43 via a pressure reducing and check valve 44, which is connected to a water passage.

The liquified refrigerant in the in-tank condenser 40, after transferring heat to the water in the tank 39, is fed via a refrigerant passage 46 to the compressor inlet heat exchanger 36 wherein it rejects heat to the surrounding vapor refrigerant and is subcooled. The liquid refrigerant is then introduced into the accumulator coil 34 via a refrigerant passage 46, wherein it is further subcooled by the liquid refrigerant accumulated inside the accumulator 33. It then is fed via a refrigerant passage 47 to a pressure regulating valve 48 wherein it is either allowed to pass therethrough without pressure and temperature changes or is subjected to adiabatic expansion to become a mixed phase refrigerant with lower pressure and temperature. The pressure regulating valve 48 controls the pressure difference between high- and low-pressure sides of the refrigeration cycle. When the valve 48 is fully open, the frictional loss therethrough becomes virtually zero, hence there is no pressure difference between high- and low-pressure sides. The refrigerant thus obtained is fed into the solar evaporator 10 via a refrigerant passage 49 and a flexible piping 50.

The pump/compressor 37 is driven by an induction motor 51 at a desired rotational speed. The opening of the pressure regulating valve 48 is controlled by a stepping motor 52 so that the valve 48 is held at a desired opening. The fan 21 is driven by an induction motor 53. The dampers 22A and 22B are installed on the housing 11 and operated by a reversible motor 54. The solar tracking mechanisms 26 employs reversible motors 55 and 56. Limit switches 57A and 57B are installed on the housing 11 against the dampers 21A and 21B and they are opened when the dampers 21A and 21B reach their fully closed or fully open positions, respectively. Limit switches 58A and 58B are opened when the motor box 29, driven by the motor 55, reaches either end of the rails 30A and 30B. Similarly, limit switches 59A and 59B are opened when the rail 28, driven by the motor 56, rotates and either end of the rail reaches the motor box 29.

Figure 2:
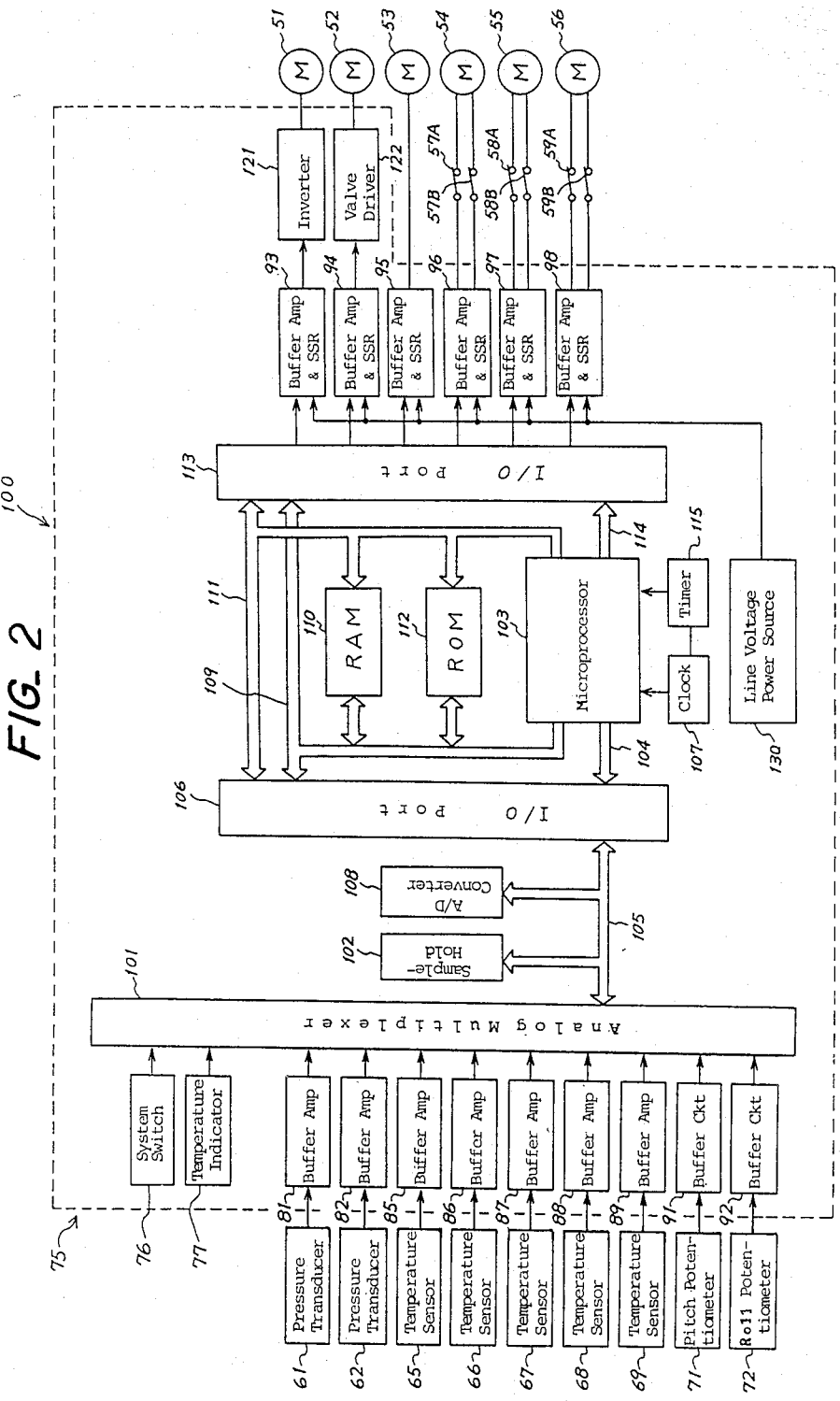
FIG. 2 is a block diagram of the control unit of FIG. 1.

The drive and control of each of these motors 51 through 56 is governed by a control unit 100 as will be described later with reference to FIG. 2. For this purpose, pressure transducers 61 and 62 are installed inside the solar evaporator coil 14 and the in-tank condenser 40 to measure the saturated evaporating pressure $p_1$ and the saturated condensing pressure $p_2$, respectively, of the refrigerant moving inside the corresponding heat exchangers. In this embodiment, these transducers are of a piezo-electric type which can also be used as a high-pressure relief sensor. When saturated vapor pressures are measured by the pressure transducers 61 and 62, the saturated evaporating and condensing temperatures can be calculated as functions of respective saturated vapor pressures. Temperature sensors 63 and 64 may replace the pressure transducers 61 and 62. Temperature sensors 63 and 64 should be installed at appropriate positions along the evaporator coil 14 and in-tank condenser 40 to measure the saturated evaporating and condensing temperatures directly.

A temperature sensor 65 is installed at the inlet of the pump/compressor 37 and measures the temperature $t_1$ on the suction side of the pump/compressor 37 which is an outlet from the low-pressure side of refrigeration cycle. Another temperature sensor 66 is installed at the inlet of the pressure regulating valve 48 and measures the temperature $t_2$ at the inlet of the valve 48 which corresponds to an outlet from the high-pressure side of the refrigeration cycle. Based on the calculated or measured saturated vapor temperatures and the measured outlet temperatures from the low- and high-pressure sides of the refrigeration cycle, the degrees of superheating and subcooling can be calculated as will be described later.

A temperature sensor 67 located inside the heat collection chamber 12 measures the chamber temperature $t_3$, while a sensor 68 located outside the solar evaporator 10 measures the ambient temperature $t_4$. The operation of the dampers 22A and 22B on the solar evaporator housing 11 is based on the temperature measured by the sensors 67 and 68. A temperature sensor 69 measures the water temperature $t_5$ contained in the water storage tank 39. Selection of either the heat pipe or heat pump mode is made based on the temperature measured by the sensors 67 and 69. In this embodiment, these temperatures sensors 63 through 69 can be of a thermister type.

A potentiometer 71 is attached to the support 27A to measure the relative angle of the support 27A with respect to the evaporator housing 11. A potentiometer 72 measures the relative travel of the motor box 29 with respect to the rails 30A and 30B.

On console panel 75 there are provided a system switch 76 which enables operation of the water heating system and a temperature indicator 77 which sets the desired hot water temperature in the tank 39. The water heating system operation is initiated based on the positions of the switch 76 and indicator 77 and the output from the temperature sensor 69 and timer 115.

The arrangement of the control unit 100 and the peripheral devices relating thereto will be described in detail now with reference to the block diagram shown in FIG. 2. As apparent from FIG. 2, the control unit 100 enclosed by the dotted line is interfaced with the peripheral devices which are shown located outside the dotted line. The input to the control unit 100 is described first. The pressure transducers 61 and 62 are employed instead of the temperature sensors 63 and 64 in this particular example. The signals obtained from the pressure transducers 61 and 62 and temperature sensors 65 through 69 are fed into the control unit 100 after the detected signals are amplified and the impedance transformed by the buffer amplifier 81, 82, 85 through 89 attached to these transducers and sensors. In the case where the temperature sensors 63 and 64 are used, the buffer amplifiers 83 and 84 will be employed. The output from the pitch potentiometer 71 and roll potentiometer 72 are fed into the control unit 100 through buffer circuits 91 and 92, respectively.

The input signals are successively sampled by an analog multiplexer 101 and then supplied to a sample-holder 102. The analog multiplexer 101 and the sample-holder 102 receive the control signals from a microprocessor 103 via control buses 104 and 105 and an input/output port 106. As the microprocessor 103, the 6502 in the form of large-scale integrated circuit (LSI hereinafter) can be used. A clock signal is supplied to this microprocessor 103 by a clock generator 107 which contains a crystal-controlled oscillator. The signals from the sample-holder 102 are supplied to an A/D converter 108 where the signals are converted into the digital signals of 8 bit-wide and then transferred to the input/output port 106. The A/D converter 108 receives the control signals for conversion from the microprocessor 103 via the control buses 104 and 105 and the input/output port 106. The 6520 of LSI, for example, can be used for the input/output port 106. The data taken into the input/output port 106 are stored in a RAM 110 through a data bus 109 which consists of 8 bits. The address of the RAM 110 is given from the microprocessor 103, via an address bus 111 which consists of 16 bits. Under the control of the microprocessor 103, the program written in a ROM 112 is executed, and the data stored in the RAM 110 are supplied through the data bus 109 to the microprocessor 103, where the necessary operation is performed. The result of the processing is supplied through the data bus 109 and an input/output port 113 to the respective output devices. This output function is performed by issuing control signals from the microprocessor 103 through the control bus 114 and the input/output port 113. In this embodiment, the 2114 of LSI is used for the RAM 110, and the 2716 of LSI is used for the ROM 112. A timer 115 receives the signal from the clock generator 107 to clock the necessary time and to send the clock signal to the microprocessor 103.

Based upon the processing performed, various output devices are controlled as follows: The rotational speed and torque of the pump/compressor 37 is governed by generating a variable frequency and variable amplitude signal from an inverter 121 via a buffer amplifier and solid state relay 93 and applying the signal to the induction motor 51. The opening of the pressure regulating valve 48 is regulated by generating an appropriate amount of pulse trains from a valve driver 122 via a buffer amplifier and solid state relay 94 and applying the signal to the stepping motor 52. An induction motor 53 for the fan is driven through a buffer amplifier and solid state relay 95. The rotational direction of the reversible motor 54 is dictated by a buffer amplifier and solid state relay 96. Limit switches 57A and 57B are installed between the buffer amplifier and solid state relay 96 and the motor 54. Similarly, the rotational direction of the reversible motors 55 and 56 are governed by buffer amplifiers and solid state relays 97 and 98. Limit switches 58A and B and 59A and B are respectively installed between the buffer amplifiers and solid state relays 97 and 98, and the reversible motors 55 and 56. A line voltage power source 130 supplies the line voltage via the buffer amplifiers and solid state relays 91 through 96 to respective output devices.

FIG. 3 is a table which explains four operating modes of the present invention. In this table, the heat collection method and the status of the component devices are specified for each mode.

Whenever the sun is shining, the system enters either the solar heat pipe or the solar heat pump mode. In both modes, the solar radiation energy is essentially utilized as a heat source. These two modes are therefore collectively referred to as a solar mode. The solar tracking mechanisms 26 are activated and the air dampers 22A and 22B on the solar evaporator housing 11 are closed to recycle the trapped air inside the housing 11 by the fan 21 for better evaporator heat transfer characteristics. The fan 21 may be deactivated in some instances for the solar heat pipe mode.

On a sunny morning, the tank water temperature and the solar evaporator temperature are both relatively low but the latter is considerably higher than the former. Hence the solar heat pipe mode is selected. In this mode, the pressure regulating valve 48 is fully opened because no flow resistance is required. Then the pressures in the evaporator coil 14 and in-tank condenser 40 are the same as are the evaporating and condensing temperatures. The pump/compressor 37 is used as a circulating "gas" pump in this situation having a low rotational speed. Its speed is controlled to obtain a desired amount of superheating. As heat is delivered to the tank 39, its temperature rises but so too does the solar evaporator temperature because the sun is still rising and the pump/compressor speed is lowered. The evaporating and condensing temperature is adjusted to a higher pressure for the refrigeration cycle by raising the solar evaporator temperature to superambient temperature, i.e., temperatures higher than ambient by 5° to 30° C.

At some point in the afternoon, the tank water temprature becomes too high to act as a heat sink. At this point a conventional solar hot water system would call upon a backup device in order to raise the water temprature another 10° C. The present invention, however, does not rely on auxiliary hardware but simply enters the solar heat pump mode by closing the pressure regulating valve 48 slightly. Therefore the refrigerant can condense in the tank 39 even though the water temperature is higher than that of the solar evaporator 10 which is still at a superambient temperature.

When the sun's radiation is intermittent or unavailable, the system enters either the solar assisted heat pump or the heat pump mode. In these modes the ambient air energy is utilized as a primary heat source. Therefore these two modes are collectively referred to as the air mode. Hence the evaporating temperature of refrigeration cycle is always at subambient temperatures, i.e., below the ambient air temperature. Both intermittent solar radiation and diffuse radiation are utilized as secondary heat sources for the solar assisted heat pump mode. Therefore, the solar tracking mechanisms 26 are typically deenergized to assume the solar evaporator's neutral position and the air dampers 22A and 22B are opened to intake fresh ambient air blown in by the fan 21 and to discharge it from the housing 11 after the heat transfer. Heat pumps operate most efficiently when the condensing temperature is as low as possible and the evaporating temperature is as high as possible. By employing a bottom-mounted in-tank condenser 40, the condensing temperature can be lowered to adjust to the varying hourly temperature profile in the tank 39. This arrangement presents a double stratified hot water layer in the tank 39, with the lower layer always having a lower water temperature than the upper because such is mixed with the incoming cold water. To raise the evaporating temperature, it is wise to operate a heat pump which has a storage tank during daytime only since the outside ambient air temperature is consistently higher during daylight hours. Also, continuous operation is known to yield higher COP's than intermittent cycling. Therefore, to comply with varying heat load without on-off cycling, the pump/compressor speed is regulated from medium to high ranges for the solar assisted heat pump and heat pump modes. In all heat pump modes, both the pump/compressor speed and the pressure regulating valve opening are actively controlled to adjust both the superheating and the subcooling of the refrigeration cycle to desired values.

An optimum operating strategy for the present invention is, then, to run the system continuously during daylight hours regardless of the existence of sunshine, generating only enough hot water for one day's consumption.

Figure 4:
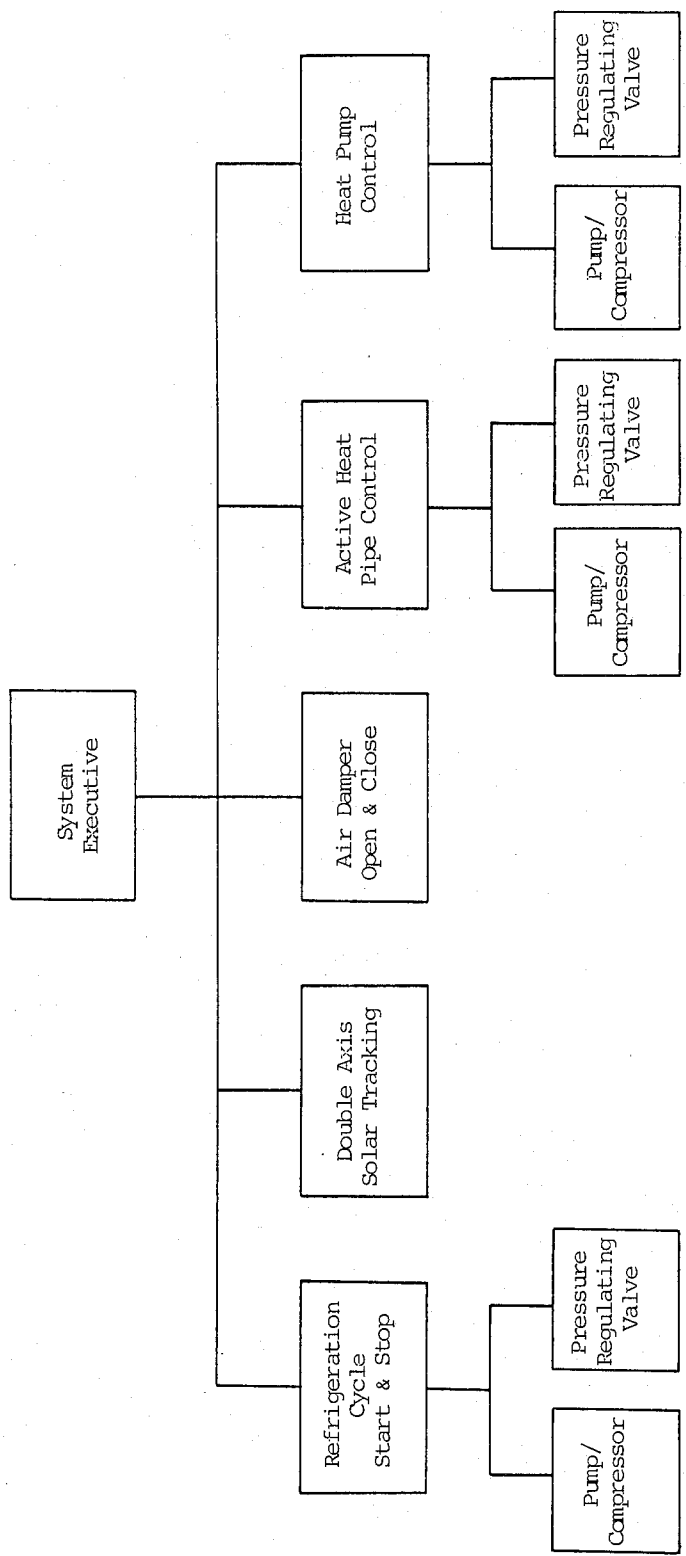
FIG. 4 is a software tree illustrating major system tasks in accordance with the present invention.

FIG. 4 shows various tasks the microprocessor 103 of the present invention performs. These tasks are described in detail below by referring to the corresponding figures.

Figure 5:
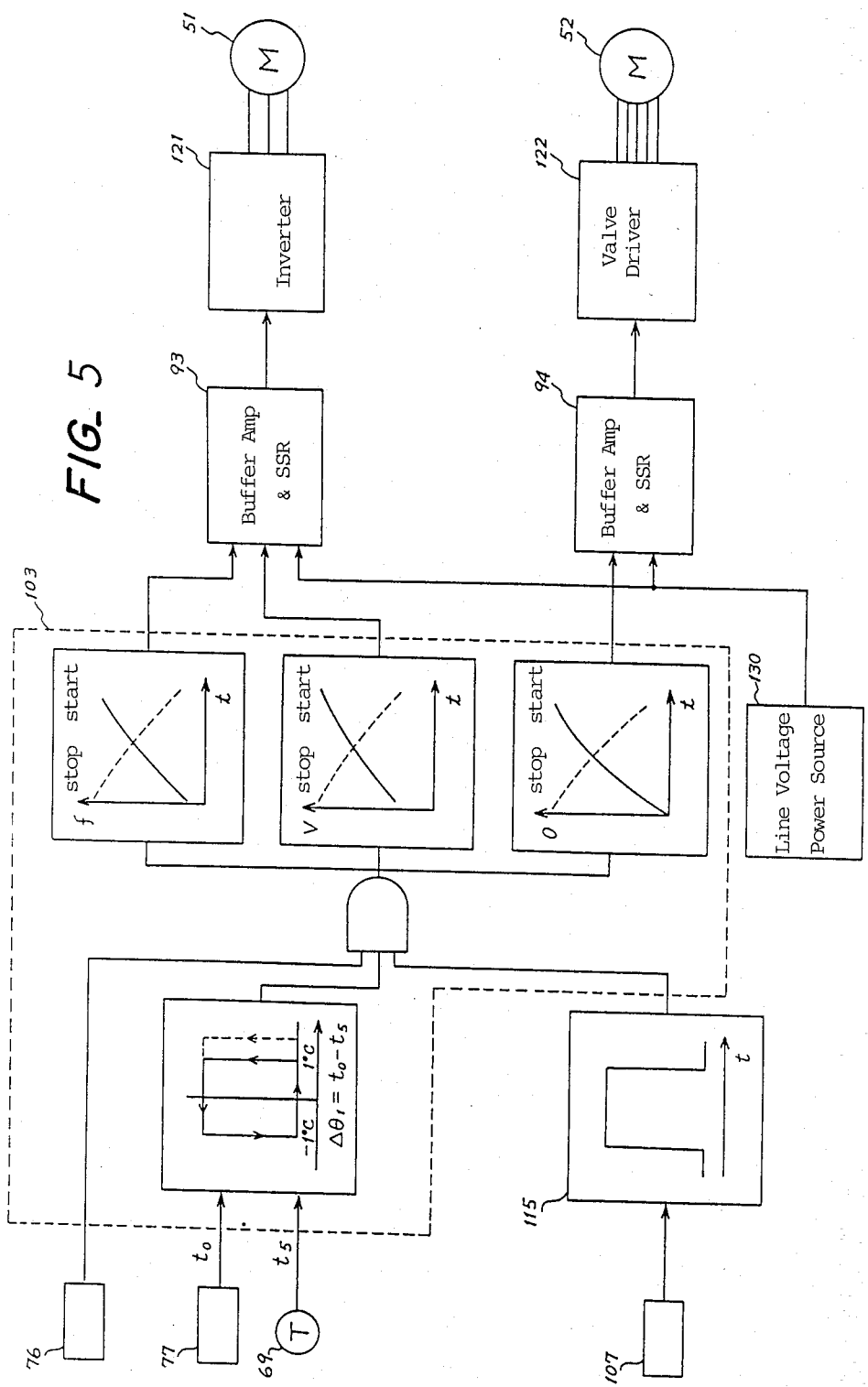
FIG. 5 is a block diagram illustrating the system's starting and stopping operation.

FIG. 5 illustrates the logic of connecting and disconnecting the line voltage power source 130 to the pump/compressor motor 51 and the stepping motor 52 to start or stop the system operation. A temperature difference $\Delta\theta_1$ is defined as $\Delta\theta_1 = t_0 - t_5$, where $t_0$ is the desired water temperature set by the temperature indicator 77 and $t_5$ is the water temperature in the storage tank 39 measured by the temperature sensor 69. This system does not initiate operation unless the set temperature $t_0$ is sufficiently higher than the tank water temperature $t_5$, e.g., $\Delta\theta_1 = t_0 - t_5 > 2°$ C. Furthermore, both the system switch 76 and the timer 115 must be switched on in order to start the system operation as shown in FIG. 5.

Before starting the system, the variable opening pessure regulating valve 48 must be closed. When the system starts, the pump/compressor speed and the valve opening are gradually increased in a coordinated fashion under the command of the microprocessor 103. As the pressure on the high-pressure side of the refrigeration cycle exceeds a set value which is detected by the pressure transducer 62, the system goes into the steady state operation where open and closed loop control takes place.

When the tank water is heated and its temperature exceeds the set value by, e.g. 2° C., the logic disconnect the line voltage power source 130 automatically from the pump/compressor motor 51 after gradually decreasing the pump/compressor speed and closing the valve opening in a coordinated fashion.

The solar tracking mechanisms 26 are designed to track the sun for approximately eight hours a day. This can be accomplished by initially installing the solar evaporator housing 11 to face true south when its neutral position is held. The solar tracking mechanisms 26 then help direct the evaporator housing 11 toward the sun during the daytime by driving it to track the sun's local azimuth and altitude, the magnitudes of which are generated by the microprocessor 103. In order to attain these angles, the evaporator housing's pitch angle $\theta_{cmd}$ is set first to duplicate the sun's altitude at the local solar noon time by the pitch motor 55. Namely, $$\theta_{cmd} = \alpha_{sn} \tag{1}$$

wherein $\alpha_{sn}$ denotes solar altitude at local solar noon time. This setting allows the evaporator housing's roll axis to point at the local north star. This pitch angle is kept untouched during the day after it is set early in the morning. The evaporator housing's roll angle $\phi_{cmd}$ and is calculated from the following equation.

$$\theta_{cmd} = \sin^{-1}(\sin\psi \cos\alpha) \tag{2}$$

wherein, $\psi$ and $\alpha$ are local solar azimuth and altitude generated by the microprocessor 103. The roll angle is updated every five to ten minutes by the roll motor 56.

Figure 6:
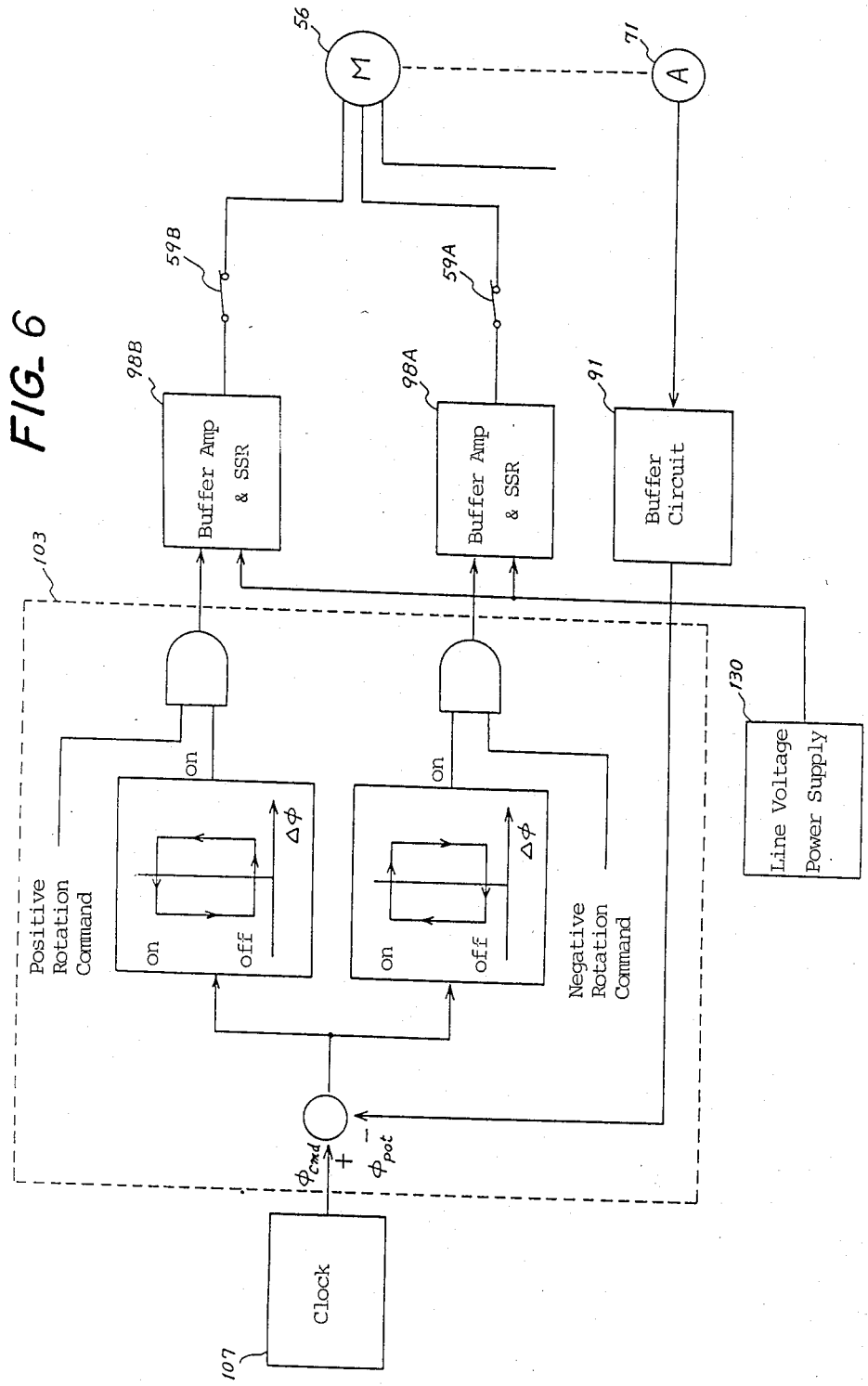
FIG. 6 is a block diagram illustrating operation of the solar tracking mechanisms.

Now, the tracking operation is explained by referring to FIG. 6 for the roll channel. The microprocessor 103 generates the desired roll angle as indicated by equation (2). The actual roll angle $\phi_{pot}$ is measured by the roll potentiometer 74 and fed back to the microprocessor 103 as a feedback signal. The microprocessor 103 then calculates the roll error angle $\Delta\phi$ as follows:

$$\Delta\phi = \phi_{cmd} - \phi_{pot} \tag{3}$$

The roll error angle $\Delta\phi$ is input into the comparators, and if the corresponding output of the comparators is positive, the relay energizing signal is applied to relays 96A or 96B, depending on the desired rotational direction of the roll motor 56. When the tracking mechanisms 26 reach the extreme negative angle, the limit switch 59A opens to inhibit the line voltage power supply 130 from applying the line voltage to the roll motor 56. Similarly, when the tracking mechanisms 26 reach the extreme positive angle, the limit switch 59B opens to disconnect the power source.

The operation of the pitch channel can occur in nearly the same way.

Figure 7:
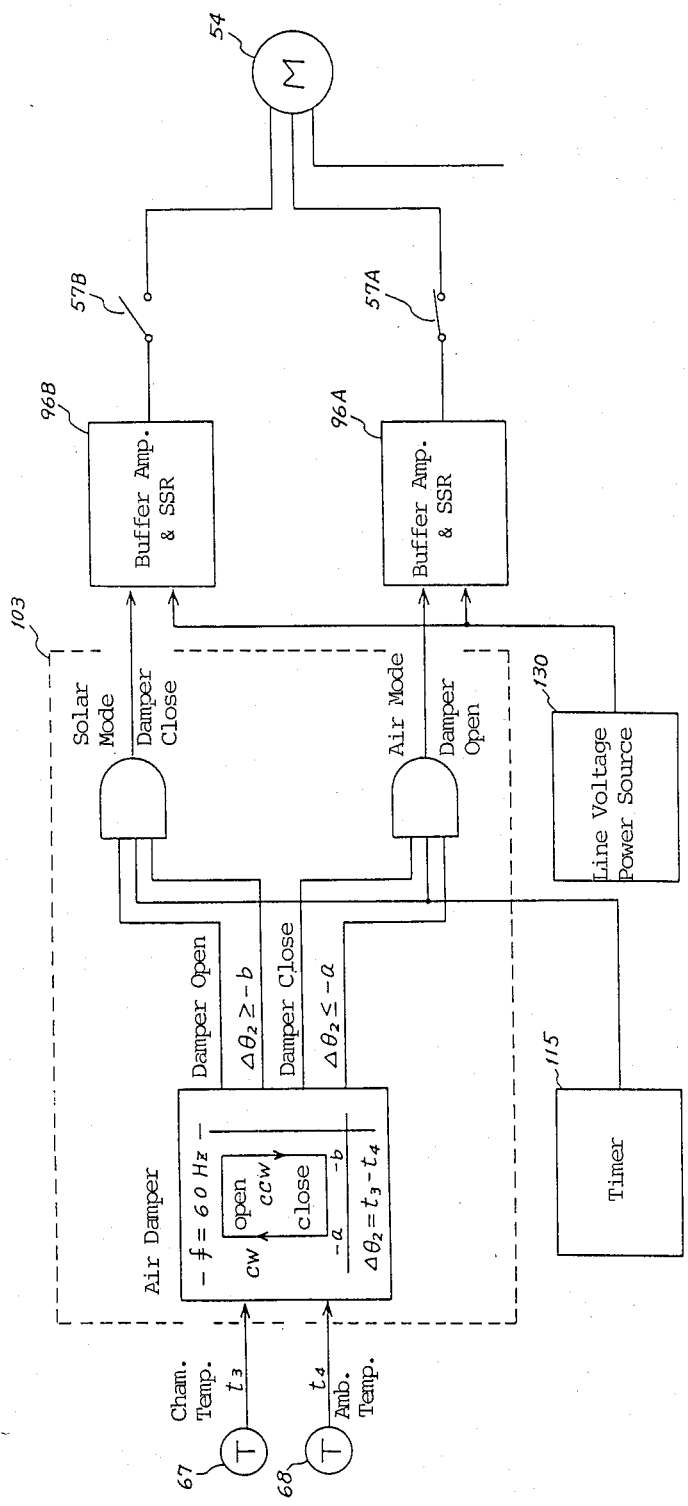
FIG. 7 is a block diagram illustrating operation of the air dampers.

As indicated in FIG. 3, the air dampers 22A and 22B are closed for the solar mode and opened for the air mode. A determination as to whether such dampers are closed or opened is made by comparing the chamber temperature $t_3$ inside the solar evaporator housing 11 and the ambient air temperature $t_4$. The open/close operation of the air dampers 22A and 22B is explained by referring to FIG. 7. When solar radiation is present, the chamber temperature $t_3$ tends to rise relative to the ambient temperature $t_4$. When the temperature difference $\Delta\theta_2 = t_3 - t_4$ begins to exceed a set value, e.g., $\Delta\theta_2 = -2°$ C. for a given pump/compressor speed, and this condition continues for a certain period of time, the microcomputer 103 issues the command to close the dampers 22A and 22B via the buffer amplifier and solid state relay 94. Upon full closure of the dampers 22A and 22B, the limit switch 57A opens to inhibit the line voltage power source 130 from further applying power to the damper motor 54.

When the weather becomes cloudy, the temperature difference $\Delta\theta_2$ drops a set value, e.g., $\Delta\theta_2 = -5°$ C. for a given pump/compressor speed. If this condition continues for a certain period of time, the microprocessor 103 causes the dampers 22A and 22B to be opened to introduce fresh outdoor air into the evaporator housing 11. When the dampers 22A and 22B are fully opened, the limit switch 57B opens to inhibit the line voltage power source 130 from further applying power to the damper motor 54. Within the solar mode, a determination has to be made as to whether the solar heat pipe or the solar heat pump mode should be selected. The functional difference between the two modes is that the pressure regulating valve 48 is fully opened or not, and accordingly the condensing temperature is nearly equal to the evaporating temperature or not, as indicated in FIG. 3.

Figure 8:
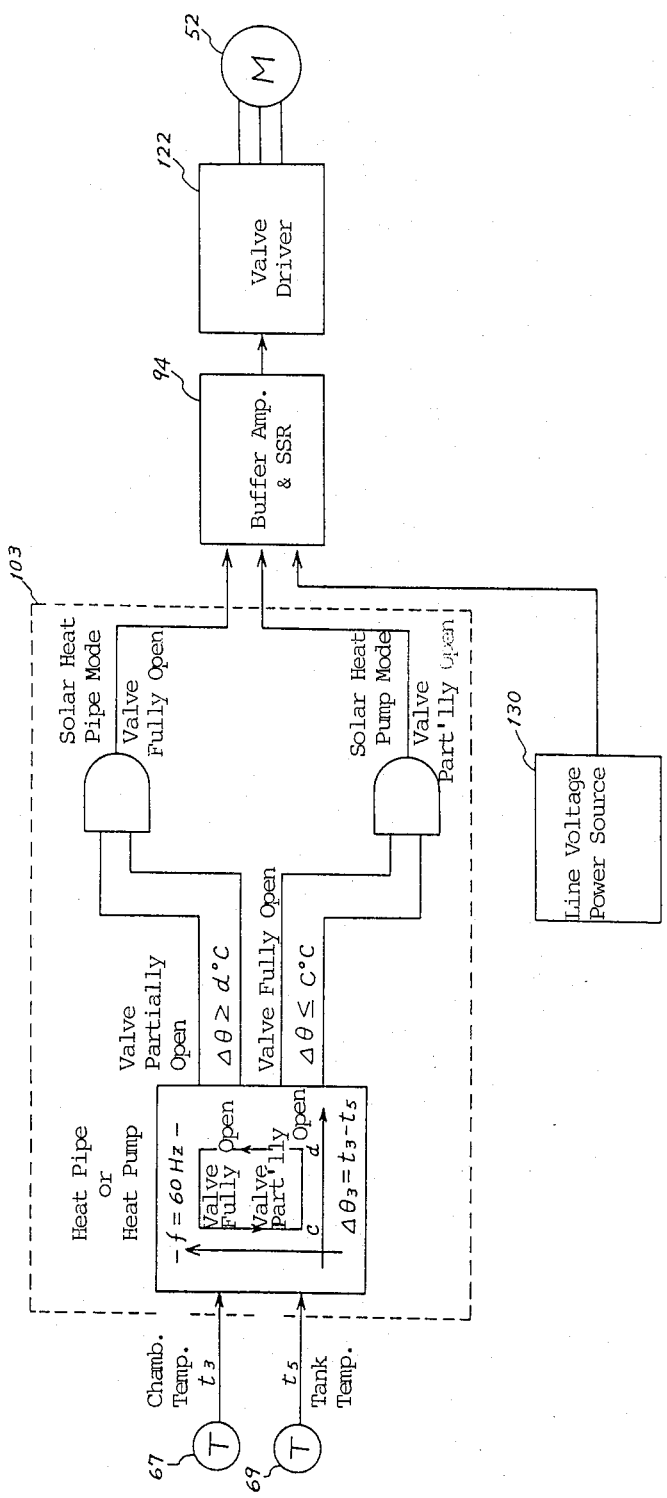
FIG. 8 is a block diagram showing the logic for selecting either the solar heat pipe or solar heat pump mode.

The selection of the heat pipe or heat pump mode is made by the microprocessor 103 as shown in FIG. 8. It is based on the temperature difference between the chamber temperature $t_3$ and the tank water temperature $t_5$, i.e., $\Delta\theta_3 = t_3 - t_5$. When the temperature difference $\Delta\theta_3$ exceeds a set value, e.g. d° C. for a given pump/compressor speed and the pressure regulating valve 48 is partially open, the solar heat pipe mode is entered by applying a signal from the pressure regulating valve driver 122 to the stepping motor 52 via the buffer amplifier and solid state relay 92 to fully open the valve 48. When the temperature difference goes below a set value, e.g. c° C. for a given pump/compressor speed and the pressure regulating valve 48 is fully open, the solar heat pump mode is entered by closing the valve 48 slightly. This mode is typically selected in the sunny afternoon when the tank water temperature becomes too high as compared to the solar evaporator temperature so as to act as a heat sink. This mode can raise the condensing temperature of the refrigeration cycle higher than the tank water temperature so that the solar radiation energy is still derived during this capping off period. Conventional solar water heating systems cannot utilize solar radiation during this period.

Figure 9:
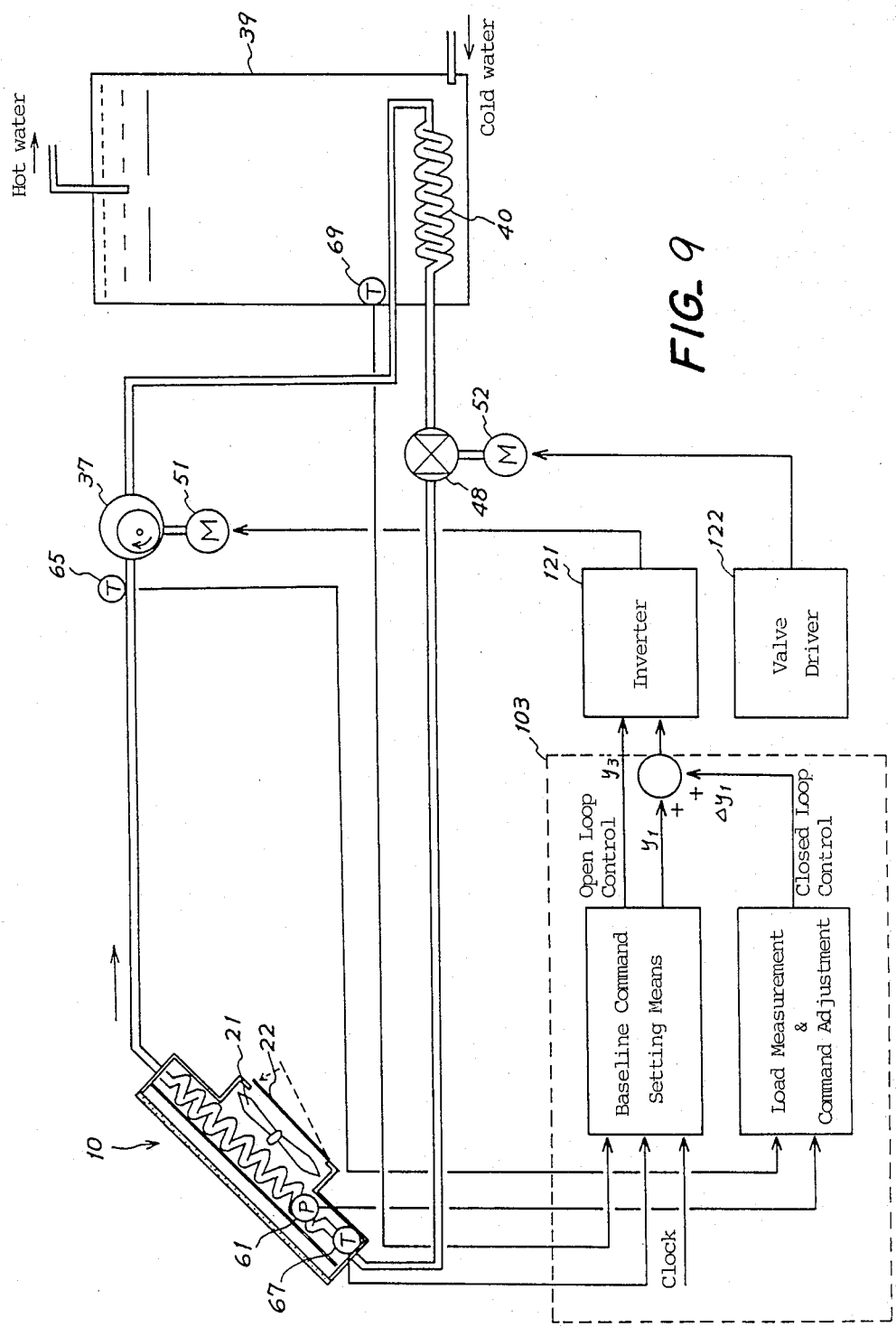
FIG. 9 is a block diagram illustrating the operation of the heat pipe mode.
Figure 10:
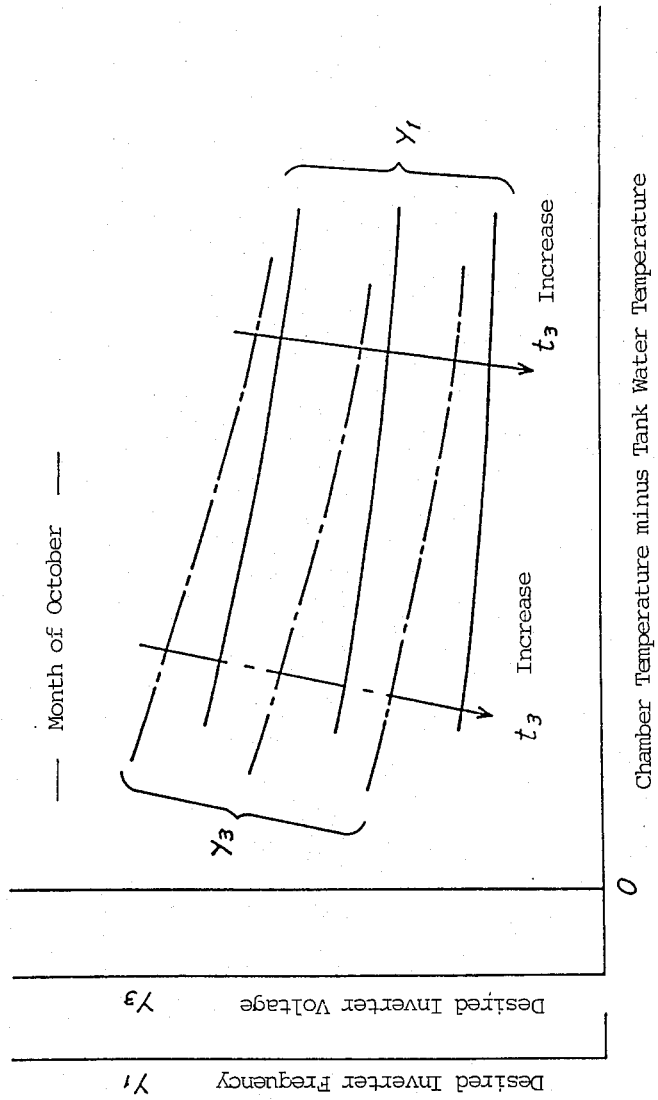
FIG. 10 is a table showing the detailed relation of the baseline command setting means in FIG. 9.

Now, the solar heat pipe mode of operation will be described by referring to FIG. 9. This mode is alternatively categorized as the heat pipe mode, air dampers 22A and 22B are closed and the fan 21 may or may not be operated. The pressure regulating valve 48 is kept fully open so that no input signal is applied to the pressure regulating valve driver 122 and the stepping motor 52. As shown in FIG. 9, active refrigeration cycle control is performed by modulating the pump/compressor's speed only. There are two types of input to the inverter 121 to regulate the speed. The first input is baseline inverter frequency and voltage command signals $y_1$ and $y_3$ as functions of the month of year, the evaporator chamber temperature $t_3$ measured by the temperature sensor 67, and the temperature difference $\Delta\theta_3$ between the chamber temperature $t_3$ and the tank water temperature $t_5$ measured by the temperature sensor 69, or $\Delta\theta_3 = t_3 - t_5$. These relations are given by a table form like the one shown in FIG. 10 and is stored in the ROM 112. This is a program control which does not relay on the feedback signals from the refrigeration cycle and is referred to as an open loop control. The other command signal is based on the superheating deviation in the refrigeration cycle. The amount of superheating varies because both the input heat energy and heat load fluctuate while the system is operating. The inverter frequency increment $\Delta y_1$ can be related to the superheating deviation $x_1$ and its rate $\dot{x}_1$ by $$\Delta y_1 = A x_1 + K \dot{x}_1 \qquad (4)$$

where A and K are the sensitivity coefficients. The superheating deviation $x_1$ is defined as $$x_1 = \Delta t_1 - \Delta t_1^* \qquad (5)$$

where $\Delta t_1^*$ is the ideal superheating given as a function of the evaporating vapor pressure $p_1$ measured by the pressure transducer 61 and $\Delta t_1$ is the present superheating defined as $$\Delta t_1 = t_1 - t_1^* \qquad (6)$$

where $t_1^*$ is the saturated evaporating temperature given as a function of the evaporating vapor pressure $p_1$ and $t_1$ is the compressor inlet temperature measured by the temperature sensor 65. $\dot{x}_1$ is the time rate signal of $x_1$ generated by the microprocessor 103. The speed increment signal $\Delta y_1$ is based on the feedback signals from the refrigeration cycle and is calculated by the microprocessor 103. Hence it is called a closed loop control.

The open loop control operation occurs, for example, every five minutes and the closed loop control is performed every 30 to 60 seconds. The combined signal $y_1 + \Delta y_1$ is therefore updated every 30 to 60 seconds in the microprocessor 103 and applied to the inverter 121. The output frequency from the inverter 121 modulates the rotational speed of the induction motor 51, and therefore the speed of the pump/compressor 37, causing the refrigerant flow rate to change. The pump/compressor speed is typically kept in low to medium ranges in the heat pipe mode.

Figure 11:
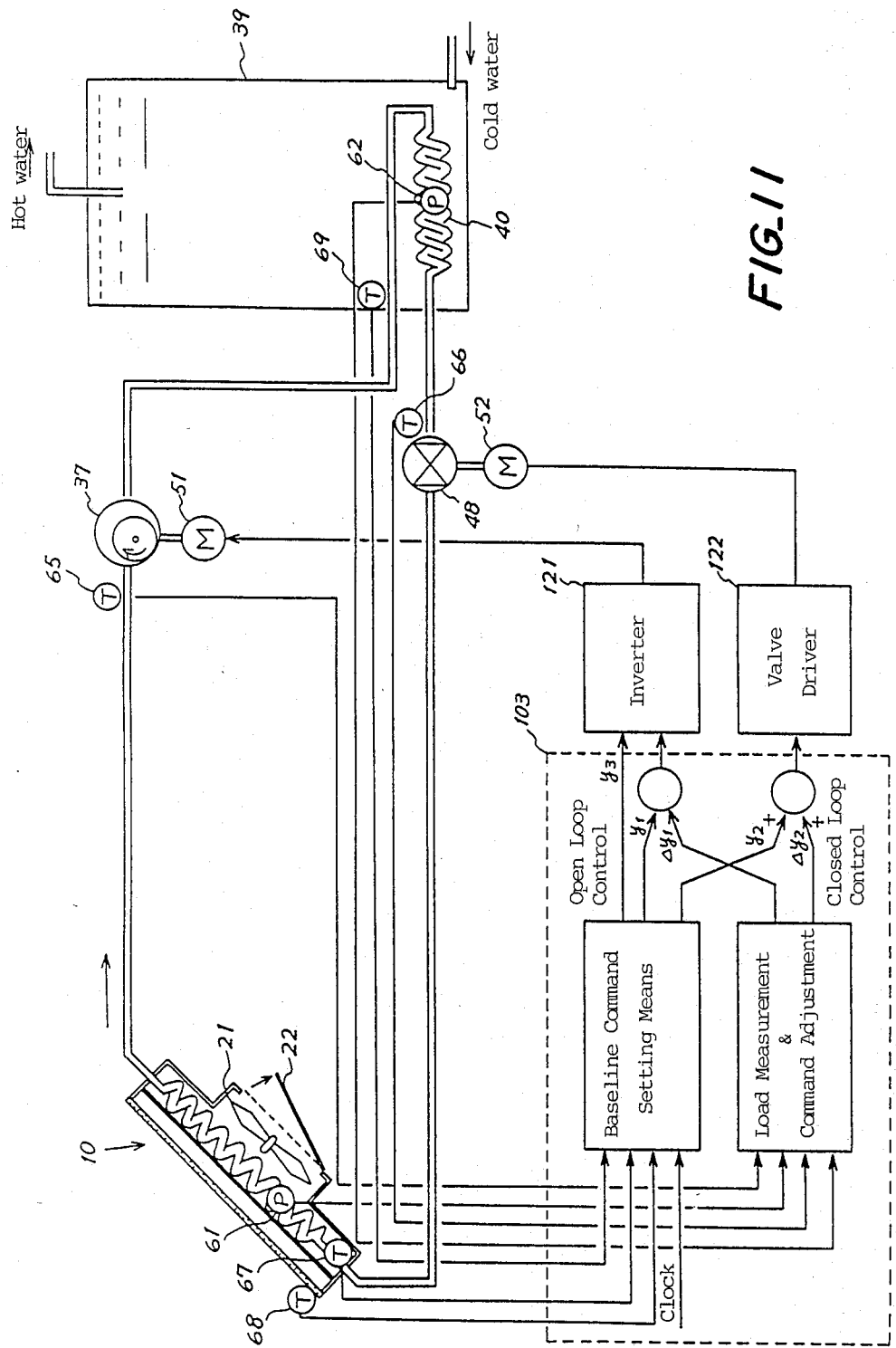
FIG. 11 is a block diagram illustrating the operation of the heat pump modes.

In the following discussion, the remaining three operating modes will be described collectively under the category of heat pump modes. They include a solar heat pump mode, a solar assisted heat pump mode and a heat pump mode. The fan 21 is driven for these modes. The air dampers 22A and 22B are closed for the solar heat pump mode and they are open for the solar assisted heat pump and heat pump modes. The operation of the heat pump modes is explained by referring to FIG. 11. Active refrigeration cycle control is performed by modulating both the pump/compressor speed and the pressure regulating valve opening.

Figure 12:
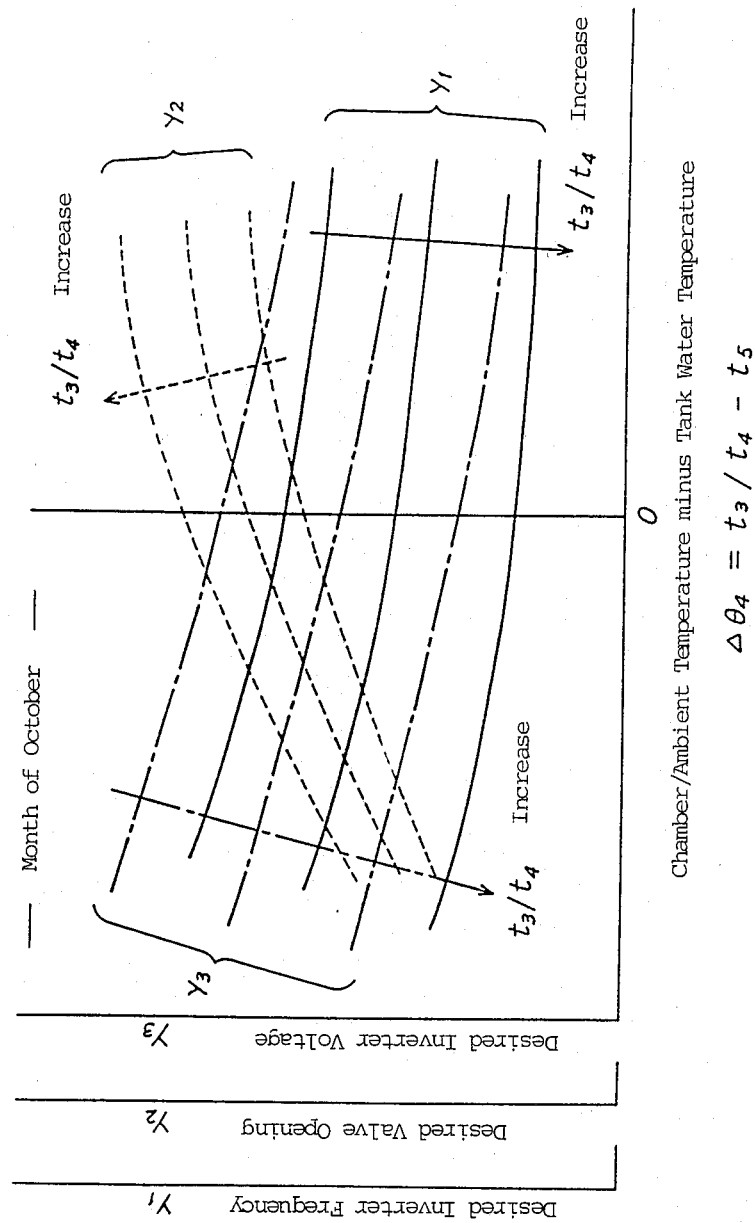
FIG. 12 is a table showing the detailed relation of the baseline command setting means in FIG. 11.

As in the case of the solar heat pipe mode, there are two types of input to the inverter 121 and the pressure regulating valve driver 122. The first type of input are baseline inverter frequency and voltage command signals $y_1$ and $y_3$ and a baseline valve opening command signal $y_2$. They are given as functions of the month of the year, the evaporator chamber temperature $t_3$ or ambient air temperature $t_4$ measured by the temperature sensor 68, and the temperature difference $\Delta\theta_4$ between either the chamber or ambient temperature $t_3/t_4$ and the tank water temperature $t_5$ or $\Delta\theta_4 = t_3/t_4 - t_5$. These relations are given by a table like the one shown in FIG. 12 and is stored in the ROM 112. These commands constitute open loop controls. The other command signals are based on the superheating and subcooling deviations in the refrigeration cycle. The inverter frequency increment $\Delta y_1$ and the valve opening increment $\Delta y_2$ can be linearly related to the superheating deviation $x_1$ and its rate $\dot{x}_1$ and subcooling deviation $x_2$ and its rate $\dot{x}_2$ by the following equations:

$$\Delta y_1 = A x_1 + K \dot{x}_1 + B x_2 + L \dot{x}_2$$

$$\Delta y_2 = C x_1 + M \dot{x}_1 + D x_2 + N \dot{x}_2 \qquad (7)$$

where A, B, C, D, K, L, M and N are sensitivity coefficients. As the definition of superheating deviation $x_1$ and its rate $\dot{x}_1$ are already set forth in equation (5), only the subcooling deviation $x_2$ and its rate $\dot{x}_2$ will be presented here. The subcooling deviation $x_2$ is $$x_2 = \Delta t_2 - \Delta t_2^* \qquad (8)$$

where $\Delta t_2^*$ is the subcooling given as a function of the condensing vapor pressure $p_2$ measured by the pressure transducer 62 and $\Delta t_2$ is the present subcooling defined as $$\Delta t_2 = t_2 - t_2^* \qquad (9)$$

where $t_2^*$ is the saturated condensing temperature given as a function of the condensing vapor pressure $p_2$ and $t_2$ is the valve inlet temperature measured by the temperature sensor 66. $\dot{x}_2$ is the time rate signal of $x_2$ generated by the microprocessor 103. The inverter frequency increment signal $\Delta y_1$ are based on the feedback signals from the refrigeration cycle and are calculated by the microprocessor 103. They, therefore, constitute the closed loop control.

In the heat pump modes, pump/compressor speed modulation is performed in the same fashion as described for the heat pipe mode. Therefore, only the valve opening control is explained here. The combined valve driving signal $y_2 + \Delta y_2$ is updated every 30 to 60 seconds in the microprocessor 103 and applied to the valve driver 122. The polarity and length of pulse trains from the valve driver 122 determines the rotational direction and angle of the stepping motor 52. The valve opening is therefore varied to cause the pressure differential between the high and low-pressure sides of refrigeration cycle to change.

Figure 13:
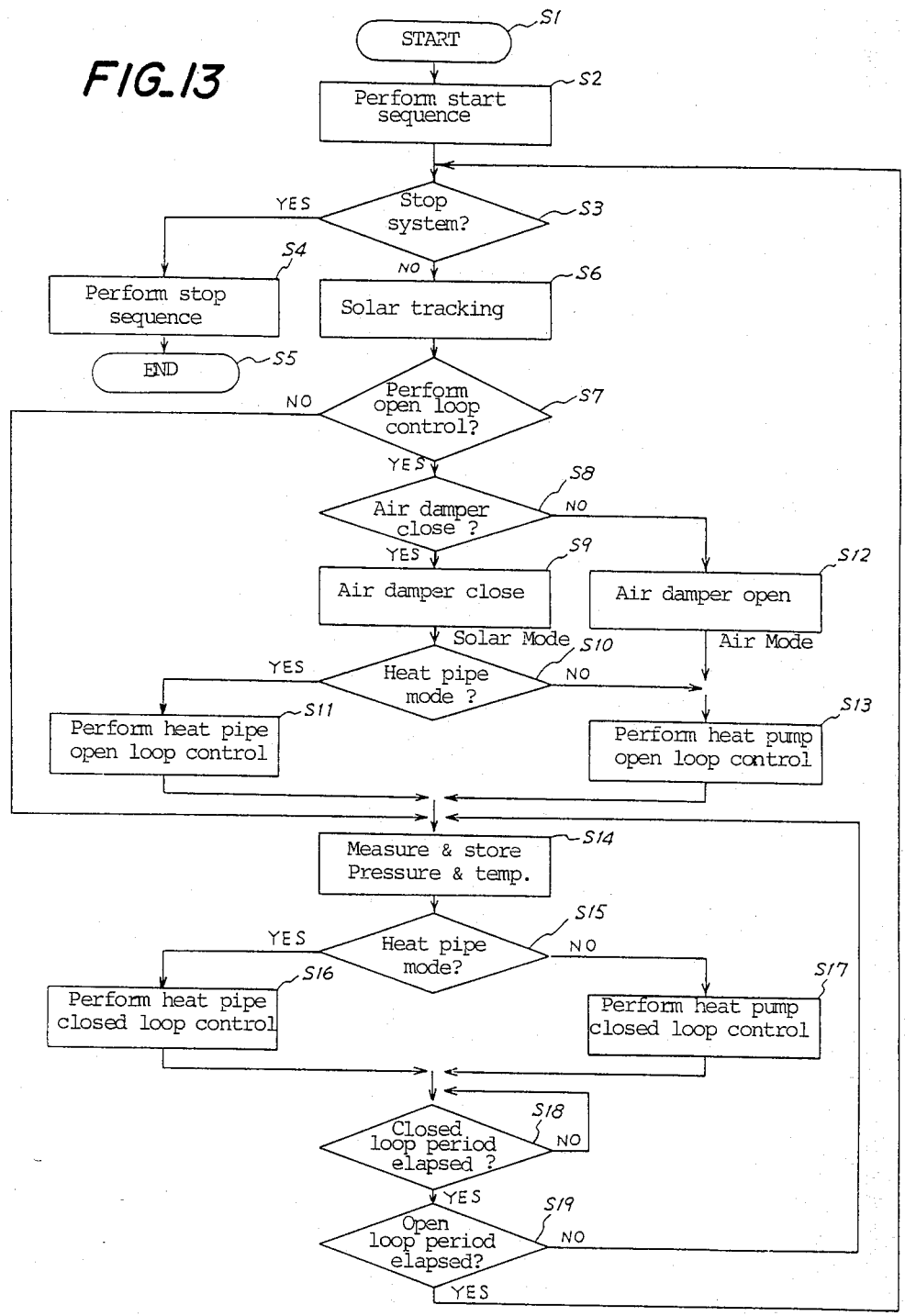
FIG. 13 is a flow chart of the system operation.

In the foregoing discussion, it was assumed that the pressure transducers 61 and 62 are employed to obtain the saturated vapor temperatures through pressure measurement. In place of the pressure transducers, however, the temperature sensors 63 and 64 can be placed inside the evaporator coil 14 and in-tank condenser 40, respectively, to measure the saturated vapor temperatures directly. The programming steps of the present invention are explained below with reference to the flow chart shown in FIG. 13.

First, step S1 initiates the system operation. More particularly, the system starts when the system switch 76 in FIG. 6 is "on", the tank water temperature $t_5$ is lower than the set water temperature to by, say 2° C., and the timer 115 is "on". After step S1, the flow enters step S2, where the starting sequences of the pump/compressor 37 and the pressure regulating valve 48 are initiated as illustrated in FIG. 6. Then step S3 determines whether the system is to be stopped. A stop condition is realized when one or more of the start conditions above is not met. If such decision is affirmatively made in step S3, the flow proceeds to step S4 where the stop sequence as shown in FIG. 8 is initiated, the tracking mechanisms 26 returns to the neutral position and the air damper is closed. The system then deenergizes in step S5. When a negative decision is made in step S3 the flow enters step S6 where necessary solar tracking updating is performed. The flow then enters step S7. Based on the pressure and temperature measurement, step S7 determines if the open loop control is necessary or not. If it is determined that no operating mode change is necessary in step S7, the open loop control is skipped and the flow jumps to step S14. When it is judged that the operating mode change is necessary in step S7, the flow enters step S8. In step S8 it is decided whether the air dampers 22A and 22B are to be closed, the flow proceeds to step S9 to close the dampers 22A and 22B and goes into the solar mode. Otherwise, the flow proceeds to open the dampers 22A and 22B in step S12 and goes into the air mode. In the solar mode, it is determined in step S10 whether the active heat pipe mode is selected or not according to FIG. 8. If the decision is made affirmatively in step S10, the flow proceeds to step S11, where the heat pipe open loop control operation is performed per FIG. 9 by determining the baseline pump/compressor speed $y_1$ in accordance with FIG. 10. If a negative decision is made in step S10, the flow proceeds to step S13, where the heat pump open loop control is performed per FIG. 11 by determining the pump/compressor speed $y_1$ and the pressure regulating valve opening $y_2$ in accordance with FIG. 12. The flow enters step S13 after step S12, where the heat pump open loop control operation is performed. After steps S11 and S13, the flow enters S14, measuring the pressures and temperatures of the refrigeration cycle and storing them in the RAM 110. The flow then goes into step S15. When a heat pipe mode is selected in step S15, the flow enters step S16. Otherwise, the flow branches to step S17. In step S16, the heat pipe closed loop control operation is performed per FIG. 9. In step S17, heat pump closed loop control operation is performed per FIG. 11. After steps S16 and S17 the flow enters step S18. In step S18, it is decided whether the closed loop control period has elapsed or not. Step S19 is entered in case of an affirmative decision in step S18 while step S18 is repeated in case of a negative decision. In step S19, it is decided whether the open loop control period has elapsed or not. If a negative decision is given, the sequence returns to step S14 to repeat the closed loop control operation. If an affirmative decision is made, then step S3 is entered to repeat the system sequence again.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A water heating system utilizing a condenser, comprising:

a solar evaporator including a heat collection chamber, first heat transfer means for receiving and transferring solar radiation heat, second heat transfer means receiving and transferring heat of ambient air, and an evaporator coil for passing refrigerant therethrough to perform heat exchange between said refrigerant and said first and second heat transfer means, thereby evaporating said refrigerant, said first and second heat transfer means and said evaporator coil being integrally incorporated in said heat collection chamber;

an accumulator with an accumulator coil by which the liquid refrigerant from said condenser rejects heat to the liquid refrigerant accumulated in said accumulator;

a compressor inlet heat exchanger for performing heat exchange between the liquid refrigerant from said condenser and the vapor refrigerant from said accumulator;

a variable speed pump/compressor connected to said solar evaporator for selectively circulating or compressing the vapor refrigerant from said evaporator;

a water storage tank for storing water;

said condenser being disposed on a bottom side in said water storage tank for passing the vapor refrigerant from said pump/compressor and for performing heat exchange between the water contained in said water storage tank and said vapor refrigerant and thus condensing said vapor refrigerant to liquid refrigerant;

a variable opening pressure regulating valve for selectively allowing passage or adiabatic expansion of the liquified refrigerant and supplying the refrigerant to said solar evaporator;

first and second pressure measuring means for measuring the saturated vapor pressure of the refrigerant passing through said solar evaporator and said in-tank condenser, respectively;

first, second, third, fourth and fifth temperature measuring means for measuring a suction side temperature of said pump/compressor, an inlet side temperature of said pressure regulating valve, a heat collection chamber temperature, an ambient air temperature and tank water temperature, respectively; and control means for controlling rotational speed of said pump/compressor and opening of said pressure regulating valve so as to satisfy load demand and at least substantially maximize a coefficient of performance of the refrigeration cycle including said solar evaporator, said pump/compressor, said in-tank condenser and said pressure regulating valve, in response to pressures and temperatures measured by said first and second pressure measuring means and said first, second, third, fourth and fifth temperature measuring means.

2. A water heating system utilizing a condenser, comprising:

a solar evaporator including a heat collection chamber, first heat transfer means for receiving and transferring solar radiation heat, second heat transfer means receiving and transferring heat of ambient air, and an evaporator coil for passing refrigerant therethrough to perform heat exchange between said refrigerant and the said first and second heat transfer means, thereby evaporating said refrigerant, said first and second heat transfer means and said evaporator coil being integrally incorporated in said heat collection chamber;

an accumulator with an accumulator coil by which the liquid refrigerant from said condenser rejects heat to the liquid refrigerant accumulated in said accumulator;

a compressor inlet heat exchanger for performing heat exchange between the liquid refrigerant from said condenser and the vapor refrigerant from said accumulator;

a variable speed pump/compressor connected to said solar evaporator for selectively circulating or compressing the vapor refrigerant from said evaporator;

a water storage tank for storing water;

said condenser being disposed on a bottom side in said water storage tank for passing the vapor refrigerant from said pump/compressor and for performing heat exchange between the water contained in said water storage tank and said vapor refrigerant and thus condensing said vapor refrigerant to liquid refrigerant;

a variable opening pressure regulating valve for selectively allowing passage or adiabatic expansion of the liquifed refrigerant and supplying the refrigerant to said solar evaporator;

first, second, third, fourth, fifth, sixth and seventh temperature measuring means for measuring a suction side temperature of said pump/compressor, an inlet side temperature of said pressure regulating valve, a heat collection chamber temperature, an ambient air temperature, a tank water temperature, an evaporating temperature and a condensing temperature; and control means for controlling rotational speed of said pump/compressor and opening of said pressure regulating valve so as to satisfy load demand and at least substantially maximize a coefficient of performance of the refrigeration cycle including said solar evaporator, said pump/compressor, said in-tank condenser and said pressure regulating valve, in response to temperatures measured by said first, second, third, fourth, fifth, sixth and seventh temperature measuring means.

3. A water heating system as claimed in claims 1 or 2 further comprising tracking mechanisms for supporting said solar evaporator and wherein said tracking mechanisms further comprise:

a motor box containing a first and a second motor means;

support means for connecting said solar evaporator to said motor box and for rotating said solar evaporator about an axle protruding from said solar evaporation;

a rail for connecting said solar evaporator to said motor box and for changing the relative position of said rail with respect to the desired roll angle of said solar evaporator;

first motor means for driving said rail to be positioned at a predetermined roll angle;

a base;

a plurality of curved rails for connecting said motor box to said base and for changing the relative position of said motor box with respect to the desired pitch angle of said solar evaporator;

second motor means for driving said motor box to be positioned at a predetermined pitch angle;

a power supply operatively associated with a plurality of limit switches for discontinuing power supply when said tracking mechanisms reach predetermined extreme positions; and control means for controlling operation of said tracking mechanisms.

4. A water heating system as claimed in claims 1 or 2, further comprising:

a plurality of air dampers for introducing fresh ambient air into said evaporator chamber or recycling the trapped air contained in said evaporator housing;

a damper motor for opening and closing said air dampers;

a plurality of limit switches for shutting off the power supply when said dampers are fully open or closed; and damper control means for opening or closing said air dampers in response to an inverter command frequency and temperatures measured by said third and fourth temperature measuring means.

5. A water heating system as claimed in claim 4 wherein said system includes four operating modes which comprise:

a solar heat pipe mode in which a solar heat source is used, the condensing temperature is nearly equal to the evaporating temperature, said air dampers are closed, said pressure regulating valve is fully open and said pump/compressor speed is relatively low;

a solar heat pump mode in which a solar heat source is used, the condensing temperature is higher than the evaporating temperature, said air dampers are closed, said pressure regulating valve is partially open and said pump/compressor speed is in the range of low to medium;

a solar assisted heat pump mode in which a solar primary heat source and secondary ambient air heat source is used, the condensing temperature is higher than the evaporating temperature, said air dampers are open, said pressure regulating valve is partially open and pump/compressor speed is medium; and a heat pump mode in which an ambient air heat source is used, the condensing temperature is higher than the evaporating temperature, said air dampers are open, said pressure regulating valve is partially open and the pump/compressor speed is in the range of medium to high.

6. A water heating system as claimed in claim 5 wherein said solar heat pipe mode and solar heat pump mode collectively further comprise a solar mode, and said solar assisted heat pump mode and heat mode collectively further comprise an air mode.

7. A water heating system as claimed in claim 5 wherein said solar heat pipe mode further comprises a heat pipe mode, and said solar heat pump mode, said solar assisted heat pump mode and said heat pump mode collectively further comprise heat pump modes.

8. A water heating system as claimed in claim 5, which further comprises refrigeration cycle start and stop means which includes:

a valve driver;

a system switch for operation control of said water heating system;

means for determining a first temperature difference between a set water temperature and tank water temperature;

first logic means for initiating or terminating operation of said water heating system as a function of said first temperature difference;

timer means for selecting a time period during which said water heating system is operational;

means for determining initiating and terminating of said refrigeration cycle as an "AND" function of said first logic means, the status of said system switch and an output from said timer means;

first memory means for storing a predetermined frequency time history of said inverter as a function of time for starting or stopping said refrigeration cycle;

second memory means for storing desired voltage time history of said inverter as a function of time for starting or stopping said refrigeration cycle; and third memory means for storing desired opening the history of said valve driver as a function of time for starting or stopping said refrigeration cycle.

9. A water heating system as claimed in claim 5, wherein said period of time further comprises a predetermined day period.

10. A water heating system as claimed in claim 3, wherein said control means for controlling operation of said tracking mechanisms furtehr comprises:

means for calculating a predetermined pitch angle and roll angle of said solar evaporator as a function of time in accordance with expression:

$$\theta_{cmd} = \alpha_{sn}$$

$$\phi_{cmd} = \sin^{-1}(\sin\psi \cos\alpha)$$

wherein, $\alpha_{sn}$ is solar altitude at local solar noon time and $\psi$ and $\alpha$ are local solar azimuth and altitude, respectively;

means for measuring actual pitch angle and roll angle of said solar evaporator; and second and third logic means for determining pitch and roll error signals between said desired pitch and roll angles and said actual pitch and roll angles and determining said pitch and roll motor's driving direction and duration.

11. A water heating system as claimed in claim 4, wherein said damper control means further comprises:

means for determining a second temperature difference between said chamber temperature and said ambient air temperature;

second timer means for enabling said solar mode or said air mode for a predetermined period of time;

fourth logic means for determining whether said dampers are open or closed as a function of said second temperature difference, an inverter command frequency, a present position of said dampers and an output from said second timer means; and means for driving said damper motor in either opening or closing direction as a function of operation of said fourth logic means.

12. A water heating system as claimed in claim 8, wherein said heat pipe mode has a heat pipe selecting means which further comprises:

means for determining a third temperature difference between said chamber temperature and said tank water temperature;

fifth logic means for determining whether said pressure regulating valve is fully opened for said solar heat pipe mode or partially opened for said solar heat pump mode as a function of said third temperature difference, said valve opening and said inverter command frequency; and means for driving pressure regulating valve as a function of said fifth logic means.

13. A water heating system as claimed in claim 7 further comprising heat pipe mode control means which includes:

open loop control means for said inverter; and
closed loop control means for said inverter.

14. A water heating system as claimed in claim 13, wherein said open loop control means for said inverter further comprises fourth and fifth memory means for storing the inverter frequency and the voltage as functions of a predetermined month of a year, said third temperature difference and said chamber temperature.

15. A water heating system as claimed in claim 13 wherein operation of said closed loop control means for said inverter is performed in accordance with the expression:

$$\Delta y_1 = Ax_1 + K\dot{x}_1$$

wherein, $\Delta y_1$ is a fine adjustment of inverter frequency, A and K are sensitivity coefficients, and $x_1$ is a superheating deviation value by the expression:

$$x_1 = \Delta t_1 - \Delta t_1^*$$

wherein present superheating $\Delta t_1$ is defined as temperature difference between the pump/compressor inlet temperature $t_1$ measured by said first temperature measuring means and a saturated evaporating temperature $t_1^*$ calculated as a function of evaporator vapor pressure measured by said first pressure measuring means, and $\Delta t_1^*$ is an ideal superheating defined as a function of said saturated evaporating temperature $t_1$.

16. A water heating system as claimed in claim 7 further comprising heat pump mode control means which includes:

open loop control means for said inverter and said valve; and
closed loop control means for said inverter and said valve.

17. A water heating system as claimed in claim 16, wherein said open loop control means for said inverter and said valve further comprises:

means for determining a fourth temperature difference between either said chamber or said ambient temperature and tank water temperature; and
sixth, seventh and eighth memory means for storing a desired inverter frequency, a voltage and a valve opening, respectively, as functions of a predetermined month of a year, said fourth temperature difference and said chamber or ambient temperature.

18. A water heating system as claimed in claim 16 wherein said closed loop control means for said inverter and said valve operates in accordance with the expression:

$$\Delta y_1 = Ax_1 + K\dot{x}_1 + Bx_2 + L\dot{x}_2$$

$$\Delta y_2 = Cx_1 + M\dot{x}_1 + Dx_2 + N\dot{x}_2$$

wherein, $\Delta y_1$ and $\Delta y_2$ are fine adjustments of inverter frequency and valve opening, respectively; A, B, C, D, K, L, M and N are sensitivity coefficients; and $x_1$ and $x_2$ are superheating and subcooling deviations defined by $$x_1 = \Delta t_1 - \Delta t_1^*$$

$$x_2 = \Delta t_2 - \Delta t_2^*$$

wherein present subcooling $\Delta t_2$ is defined as a temperature difference between a saturated condensing temperature $t_2^*$ calculated as a function of the condensing vapor pressure $p_2$ measured by said second pressure measuring means and pressure regulating valve inlet temperature $t_2^*$ and measured by said second temperature means, and $\Delta t_2^*$ is an ideal subcooling defined as a function of saturated condensing temperature and $\dot{x}_1$ and $\dot{x}_2$ are the time rates of $x_1$ and $x_2$ calculated by said microprocessor.

19. A water heating system as claimed in claim 13 wherein said open loop control means is entered into every five to ten minutes and said closed loop control means operates every thirty to sixty seconds.

20. A water heating system as claimed in claim 19 wherein said open loop control means is not operational when no operating mode change is necessary.

21. A water heating system as claimed in claim 3 wherein said system includes four operating modes which comprise:

a solar heat pipe mode in which a solar heat source is used, the condensing temperature is nearly equal to the evaporating temperature, solar tracking is operational, said air dampers are closed, said pressure regulating valve is fully open and said pump/compressor speed is relatively low;

a solar heat pump mode in which a solar heat source is used, the condensing temperature is higher than the evaporating temperature, solar tracking is operational, said air dampers are closed, said pressure regulating valve is partially open and said pump/compressor speed is in the range of low to medium;

a solar assisted heat pump mode in which a solar primary heat source and secondary ambient air heat source is used, the condensing temperature is higher than the evaporating temperature, solar tracking is non-operational, said air dampers are open, said pressure regulating valve is partially open and pump/compressor speed is medium; and a heat pump mode in which an ambient air heat source is used, the condensing temperature is higher than the evaporating temperature, solar tracking is non-operational, said air dampers are open, said pressure regulating valve is partially open and the pump/compressor speed is in the range of medium to high.

22. A water heating system as claimed in claim 21 wherein said solar heat pipe mode and solar heat pump mode collectively further comprise a solar mode, and said solar assist heat pump mode and heat mode collectively further comprise an air mode.

23. A water heating system as claimed in claim 21, wherein said solar heat pipe mode further comprises a heat pipe mode, and said solar heat pump mode, said solar assisted heat pump mode and said heat pump mode collectively further comprise heat pump modes.

24. A water heating system as claimed in claim 21, which further comprises refrigeration cycle start and stop means which includes:
- a valve driver;
- a system switch for operation control of said water heating system;
- means for determining a first temperature difference between a set water temperature and tank water temperature;
- first logic means for initiating or terminating operation of said water heating system as a function of said first temperature difference;
- timer means for selecting a time period during which said water heating system is operational;
- means for determining initiating and terminating of said refrigeration cycle as an "AND" function of said first logic means, the status of said system switch and an output from said timer means;
- first memory means for storing a predetermined frequency time history of said inverter as a function of time for starting or stopping said refrigeration cycle;
- second memory means for storing desired voltage time history of said inverter as a function of time for starting or stopping said refrigeration cycle; and
- third memory means for storing desired opening time history of said valve driver as a function of time for starting or stopping said refrigeration cycle.

25. A water heating system as claimed in claim 4 wherein said system includes four operating modes which comprises:
- a solar heat pipe mode in which a solar heat source is used, the condensing temperature is nearly equal to the evaporating temperature, solar tracking is operational, said air dampers are closed, said pressure regulating valve is fully open and said pump/compressor speed is relatively low;
- a solar heat pump mode in which a solar heat source is used, the condensing temperature is higher than the evaporating temperature, solar tracking is operational, said air dampers are closed, said pressure regulating valve is partially open and said pump/compressor speed is in the range of low to medium;
- a solar assisted heat pump mode in which a solar primary heat source and secondary ambient air heat source is used, the condensing temperature is higher than the evaporating temperature, solar tracking is non-operational, said air dampers are open, said pressure regulating valve is partially open and pump/compressor speed is medium; and
- a heat pump mode in which an ambient air heat source is used, the condensing temperature is higher than the evaporating temperature, solar tracking is non-operational, said air dampers are open, said pressure regulating valve is partially open and the pump/compressor speed is in the range of medium to high.

26. A water heating system as claimed in claim 25 wherein said solar heat pipe mode and solar heat pump mode collectively further comprise a solar mode, and said solar assist heat pump mode and heat mode collectively further comprise an air mode.

27. A water heating system as claimed in claim 25, wherein said solar heat pipe mode further comprises a heat pipe mode, and said solar heat pump mode, said solar assisted heat pump mode and said heat pump mode collectively further comprise heat pump modes.

28. A water heating system as claimed in claim 25, which further comprises refrigeration cycle start and stop means which includes:
- a valve driver;
- a system switch for operation control of said water heating system;
- means for determining a first temperature difference between a set water temperature and tank water temperature;
- first logic means for initiating or terminating operation of said water heating system as a function of said first temperature difference;
- timer means for selecting a time period during which said water heating system is operational;
- means for determining initiating and terminating of said refrigeration cycle as an "AND" function of said first logic means, the status of said system switch and an output from said timer means;
- first memory means for storing a predetermined frequency time history of said inverter as a function of time for starting or stopping said refrigeration cycle;
- second memory means for storing desired voltage time history of said inverter as a function of time for starting or stopping said refrigeration cycle; and
- third memory means for storing desired opening time history of said valve driver as a function of time for starting or stopping said refrigeration cycle.

* * * * *